Aug. 29, 1944.  L. HATHAWAY  2,356,741
TRAILER
Filed Dec. 1, 1941   2 Sheets-Sheet 1

Inventor
Lawrence Hathaway
by Mawhinney & Mawhinney
Attorneys.

Aug. 29, 1944.                L. HATHAWAY                    2,356,741
                                 TRAILER
                            Filed Dec. 1, 1941              2 Sheets-Sheet 2
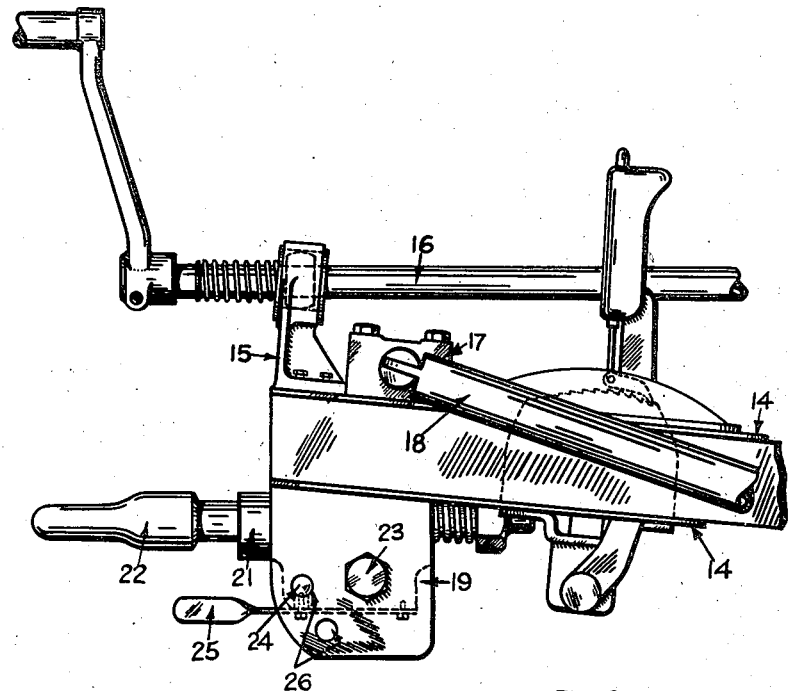
FIG. 3.
FIG. 4.
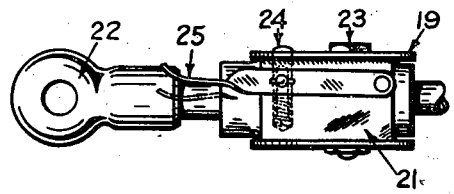

Patented Aug. 29, 1944

2,356,741

UNITED STATES PATENT OFFICE 2,356,741

TRAILER

Lawrence Hathaway, Coventry, England, assignor to Coventry Climax Engines Limited, Coventry, England Application December 1, 1941, Serial No. 421,216
In Great Britain January 15, 1941

1 Claim. (Cl. 280—33.4)

This invention relates to a trailer for an engine-driven pump which may be used for fire-fighting or other purposes, and, although not limited in this respect, it is particularly applicable to a two-wheeled trailer.

At the present time the practice is for the pump to be disposed at the rear of the unit, the engine having a starting handle which extends forwardly and is journalled in a bracket above the towing end, whilst the towing-piece is disposed beneath it. The towing end is also fitted with hand-towing bars which can extend from opposite sides of the towing end at a higher level than the towing-piece, these bars usually being detachable or mounted so as to be foldable to an out-of-the-way position when not required for use.

The main object of the invention is to provide a simple and inexpensive chassis-frame by means of which the pumping unit will be lower than is at present the case, thus making for stability during transit; but at the same time it is desirable that certain parts at the towing end (for example, the towing-piece or hand-towing bars) should be substantially at the ordinary height above the ground.

According to the invention, the chassis-frame slopes from the towing end downwardly towards the rear end, the axle (or axles) being dropped to be beneath the chassis-frame. The latter is conveniently built up of straight longitudinals and straight cross members for the sake of simplicity and the rear cross member is preferably disposed so as to allow of the pump being withdrawn for inspection or other purposes whilst the rest of the unit is in position on the chassis-frame. Conveniently, too, the latter has longitudinals which are inclined towards one another, meeting, or substantially meeting, at the towing end.

In this case the supporting bracket, for the starting handle, at the towing end may be shorter than usual, in conformity with the lowering of the unit, and to avoid the possibility of the starting handle fouling the towing-piece the latter is preferably mounted so as to be movable into an out-of-the-way position when desired.

In the accompanying sheets of drawings:

Figure 3 is an elevation, to a larger scale, of the towing end; and

Figure 4 is an underside plan thereof.

Figure 1:
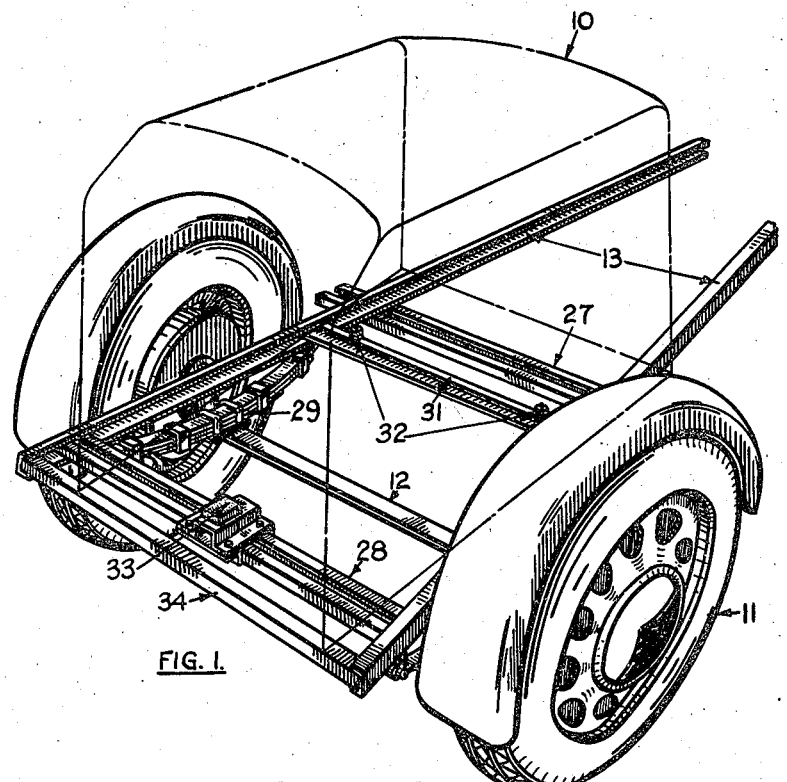
Figure 1 is a perspective view of a trailer chassis according to the invention; the casing round the pumping unit being shown in outline.
Figure 2:
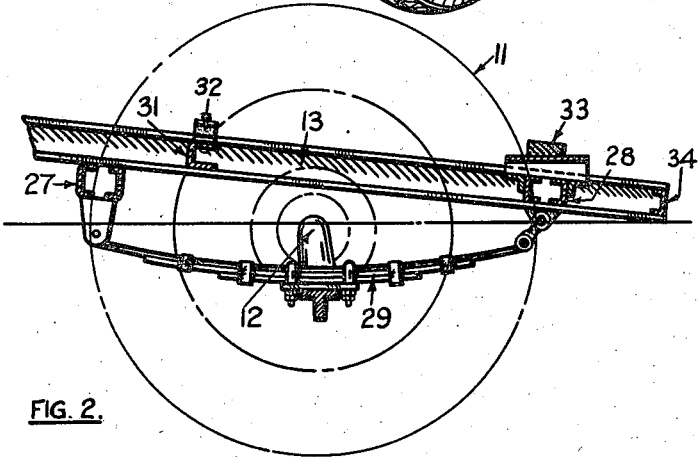
Figure 2 is a sectional elevation of the rear portion of the chassis.

In the construction illustrated the engine-driven pump itself is omitted, only the casing 10 round the pumping unit being shown for the sake of simplicity. The chassis-frame, which is mounted on a pair of wheels 11 at the ends of a dropped "through" axle 12, includes a pair of straight longitudinals 13 of channel-section, the flanges of which are preferably inwardly facing as shown. These longitudinals, in plan view, approach perceptibly towards one another at the towing end, where they are secured together by upper and lower plates 14. The upper plate carries a relatively-short bracket 15 with a hole in it through which the starting handle 16 extends, and, in addition, brackets 17 for the support of the hand-towing bars 18. The lower plate carries a bracket 19 for a guide 21 in which the towing-piece 22, for example, an eye-piece, is slidably supported through springs in a known manner; and the guide 21 is mounted in the bracket for movement about a horizontal axis 23 such that it can be turned to allow the towing-piece to fall into an out-of-the-way position when desired—for example, when the engine is to be cranked. The guide can be held in the operative towing position shown by means of a spring-pressed plunger 24 which is carried by the guide and provided with a finger-piece 25 by which it can be withdrawn when the towing-piece is to be let down. The bracket holes 26 with which the plunger 24 coacts indicate the extent of movement allowed to the guide.

There are two main cross members remote from the towing end, of which the forward one 27 is secured to the underside of the chassis longitudinals and the rear one 28 to the longitudinals midway of their height. These two cross members, which may serve for the support of the pumping unit, can be disposed at substantially the same level relatively to the ground (when the trailer is being normally towed) owing to the slope (in side elevation) of the longitudinals, thus enabling the pumping unit to be mounted on the chassis-frame with its main axis substantially horizontal. Each of the cross members is of box section, being formed of two channels with their flanges directed towards one another. The suspension springs 29 are connected at their forward ends to the front cross member 27 outside the longitudinals, and the rear ends of the springs are shackled substantially beneath the longitudinals.

In the present instance the front cross member 27 is not, however, used for the support of the pumping unit, but instead there is a channel-sectioned cross members 31, fitted into the longitudinals, carrying two spaced rubber pads 32 for the support of the forward end of the unit. The rear end of the unit is supported through a rubber pad 33 mounted centrally of the main rear cross member 28, thus providing a three-point mounting for the unit. At the rear extremity of the longitudinals is arranged a further cross member 34 to be at a level below the underside of the pump, so that the latter can at any time be withdrawn from the engine whilst the rear of the pumping unit is in position on the chassis-frame. The cross member 34 is of channel section, and it also fits into the longitudinals.

Thus, by means of the invention the unit as a whole can be lowered whilst leaving certain parts at the towing end of the trailer at substantially normal levels. Furthermore, the chassis-frame is built up of straight longitudinals and cross members, and the rear cross member is arranged so as to allow of the pump being withdrawn in a very simple manner.

What I claim as my invention and desire to secure by Letters Patent of the United States is:

A trailer chassis including a pair of straight longitudinals which diverge (in plan view) from the towing end and which also slope downwardly from the towing end towards the rear end, upper and lower plates securing the longitudinals together at the towing end, two main cross members each formed of a pair of channel irons disposed with their flanges directed towards one another, the front main cross member being secured to the underside of the longitudinals and extending laterally beyond both longitudinals, the rear main cross member being level with the adjacent portions of the longitudinals, a through axle passing beneath the longitudinals, and fore-and-aft laminated springs connected intermediate their ends to the axle, the forward ends of the springs being connected to the extending portions of the front main cross member and the rear ends of the springs being connected to the underside of the longitudinal where the rear main cross member is secured.

LAWRENCE HATHAWAY.